United States Patent [19]
Claps

[11] Patent Number: 5,690,453
[45] Date of Patent: Nov. 25, 1997

[54] METHOD AND APPARATUS FOR TRANSPORTING CARS

[75] Inventor: William R. Claps, Glen Ridge, N.J.

[73] Assignee: Global Transport Systems, Inc., Glen Ridge, N.J.

[21] Appl. No.: 390,743

[22] Filed: Feb. 17, 1995

Related U.S. Application Data

[63] Continuation-in-part of Ser. No. 228,091, Apr. 15, 1994, Pat. No. 5,489,171.

[51] Int. Cl.[6] .................................................. E04H 06/06
[52] U.S. Cl. ........................ 410/24; 414/786; 414/499; 414/398
[58] Field of Search ........................... 414/498, 499, 414/500, 398, 400, 390, 395, 786; 410/24–29.1, 4

[56] References Cited

U.S. PATENT DOCUMENTS

| | | | |
|---|---|---|---|
| 3,675,795 | 7/1972 | Dluhy | 414/234 |
| 4,124,119 | 11/1978 | Nordstrom | 410/13 |
| 4,668,141 | 5/1987 | Petersen | 410/13 |
| 4,668,142 | 5/1987 | Fity et al. | 410/29.1 |
| 4,768,916 | 9/1988 | Gearin et al. | 414/498 |
| 4,917,557 | 4/1990 | Kato et al. | 410/26 |
| 4,919,582 | 4/1990 | Bates et al. | 414/499 |
| 4,963,067 | 10/1990 | Gearin et al. | 414/498 |
| 5,040,935 | 8/1991 | Gearin et al. | 414/400 |
| 5,051,046 | 9/1991 | Oren . | |
| 5,054,987 | 10/1991 | Thornton | 414/499 |
| 5,067,862 | 11/1991 | Andre . | |
| 5,213,458 | 5/1993 | Preller et al. | 414/498 |
| 5,253,975 | 10/1993 | Takaguchi | 414/498 |
| 5,297,908 | 3/1994 | Knott . | |
| 5,332,345 | 7/1994 | Lillard . | |
| 5,344,266 | 9/1994 | Kolb . | |

FOREIGN PATENT DOCUMENTS

| | | | |
|---|---|---|---|
| 1220973 | 1/1960 | France . | |
| 898554 | 11/1953 | Germany . | |
| 1052909 | 3/1959 | Germany | 410/26 |
| 3443662 | 6/1986 | Germany | 410/24 |
| 209225 | 8/1989 | Japan | 414/500 |
| WO81 01997 | 7/1981 | WIPO . | |

*Primary Examiner*—Karen B. Merritt
*Assistant Examiner*—Gregory A. Morse
*Attorney, Agent, or Firm*—Brumbaugh, Graves, Donohue & Raymond

[57] ABSTRACT

Cars are loaded individually onto pallets at assembly plants and remain on the pallets until they reach dealers. Most of the palleted cars are transported in specially equipped, closed rail cars from each assembly plant to a main distribution center where they are unloaded, allocated to either satellite distribution centers or to dealers, and reloaded for transport ultimately to the dealers, often via a satellite distribution center. The same pallets can be used to transport the cars in highway trailers and standard intermodal cargo containers. The cars remain on the pallets, are never driven, and are protected from weather and vandalism from the time they leave the plant until they reach the dealers' lots.

17 Claims, 18 Drawing Sheets

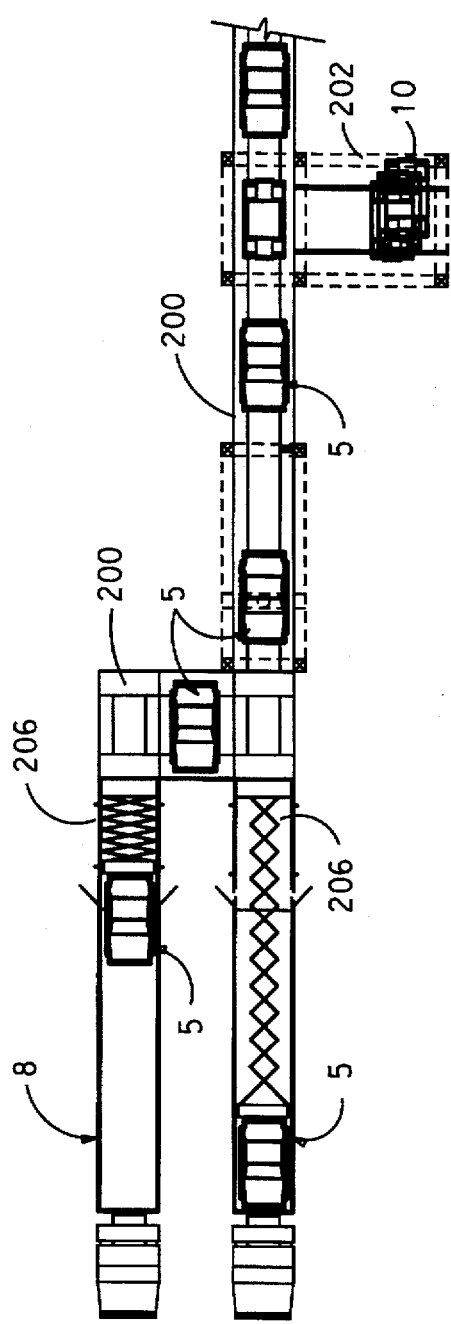
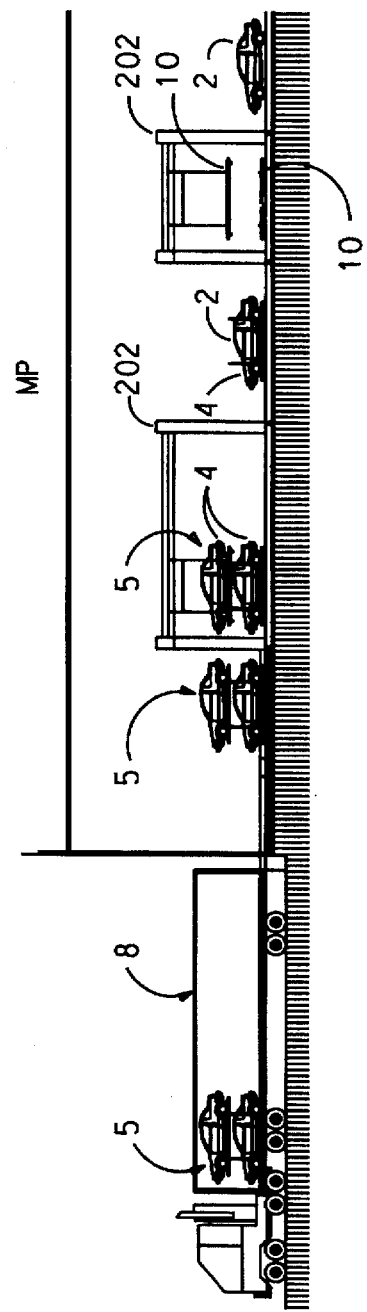
FIG. 2
FIG. 3

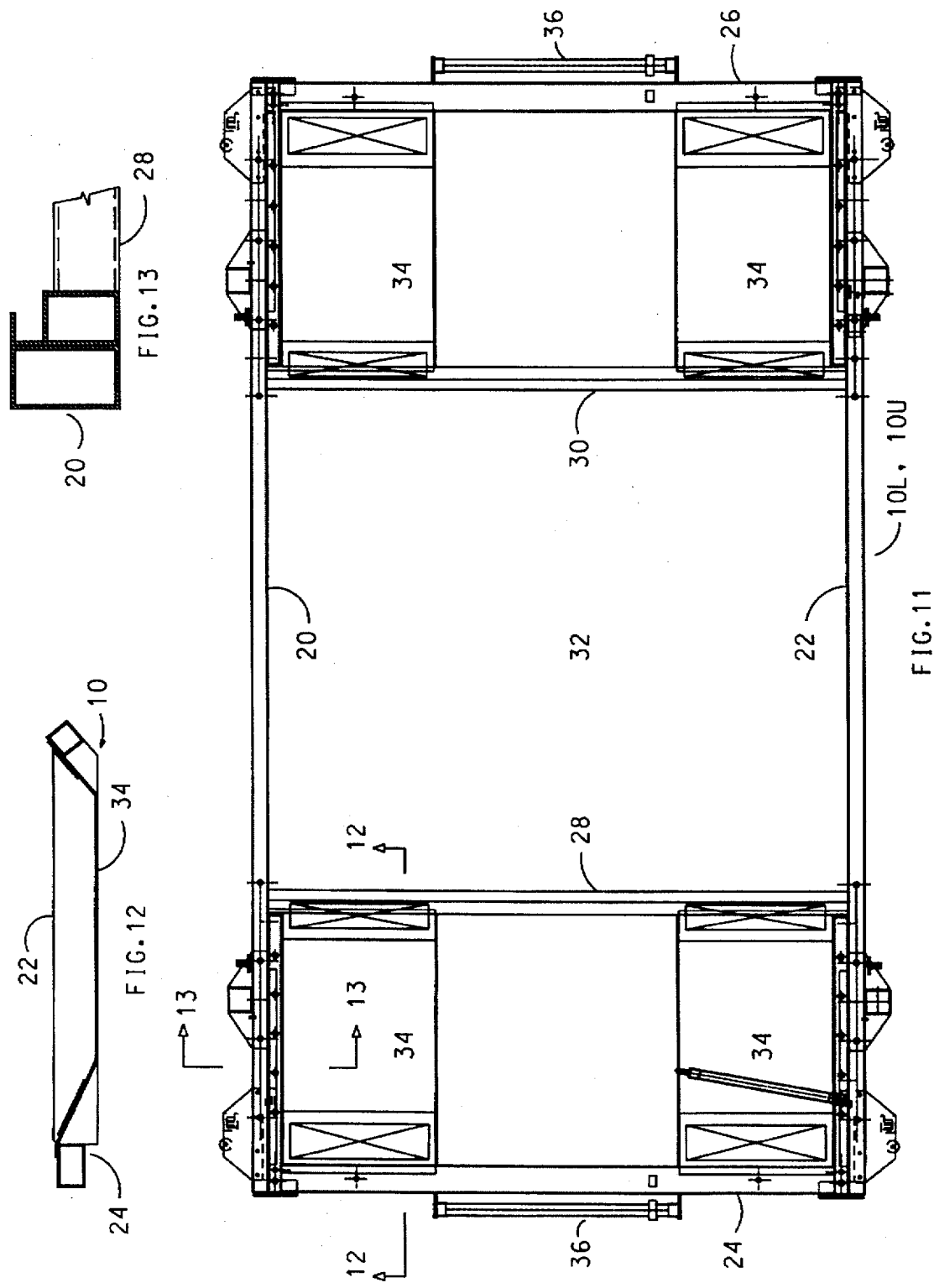

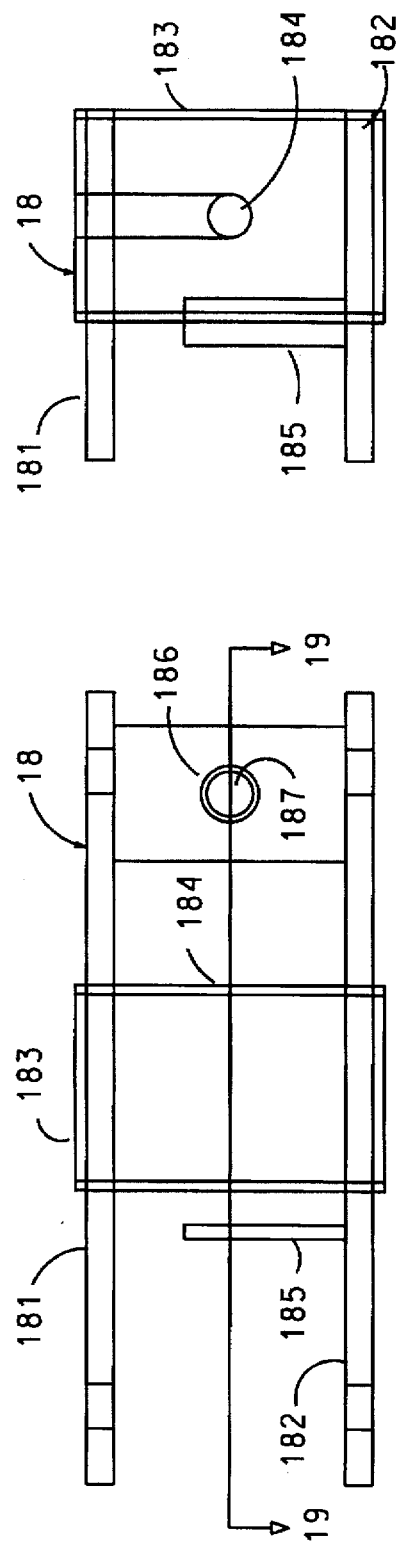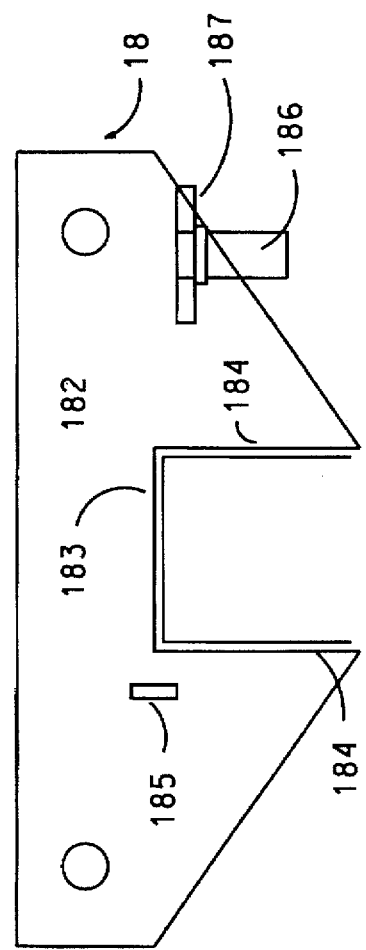

METHOD AND APPARATUS FOR TRANSPORTING CARS

The present application is a continuation-in-part of U.S. patent application Ser. No. 08/228,091 filed Apr. 15, 1994 now U.S. Pat. No. 5,489,171, issued Feb. 6, 1996.

BACKGROUND OF THE INVENTION

Automobile assembly plants are generally located long distances from the markets where the cars will be sold. Although many cars are transported from the plant on highway car carriers to nearby dealers (for example, dealers up to about 250 miles from the plant), the majority of cars manufactured in the U.S., Mexico, and Canada are moved by bi-level or tri-level autorack rail cars from the plant to a central distribution point, where they are then driven off the rail cars, stored temporarily, and driven onto highway car carriers for transport to dealers. The term "cars" is used herein to refer not only to passenger automobiles but to station wagons, pick-up trucks, sport vehicles, and vans, and, more generally, to all motor vehicles generally comparable in size to passenger automobiles.

The traditional modes of transport for the car industry have a number of disadvantages. Moving cars from the assembly line to temporary storage lots, then to the rail and truck loading facilities, and subsequent movements at distribution centers is highly labor intensive—people have to drive the cars to a destination and return for more cars. Damage due to human contact is a major problem. Because the cars have to be driven onto and off of the rail cars and car carriers and driven in storage lots and parked in tight places, damage to doors and damage from occasional collisions with parked cars are common. The doors of cars in transit from assembly plants to dealers are ordinarily left unlocked and the keys are left in the cars for easy accessibility to the drivers who drive them when they are transferred to and from storage sites and transport vehicles. From time to time, persons enter the unlocked cars that are being transported and damage them. Also, the cars are exposed to the weather, with hail being the most serious hazard, and to vandalism. There is, therefore, a need for a faster, safer and more economical means of transporting cars from assembly plants to dealers.

Another problem with the present modes of car transportation is that the autorack rail cars and highway car carriers are costly to manufacture and are unsuitable for transporting other cargo. The empty return trips from their destinations are wasteful of the equipment, the fuel consumed, the personnel, and the railways and roadways. There is, therefore, a need for providing for transport of cars by equipment that has cargo space suitable for transporting other cargo, not only when the rail cars and trailers are returned to their point of origin but for general use as well.

A number of attempts have been made to solve the problems discussed above. For example, Gearin et al. U.S. Pat. No. 5,040,935 describes and shows a system for loading and transporting cars inside shipping containers. The cars are loaded onto carrier racks outside the shipping container and then placed into the container, where they are protected from external hazards. While the transporter system disclosed in the Gearin patent has attained some limited acceptance commercially, the system has a number of problems.

The Gearin system includes a highly complex, costly frame structure, which requires the use of equally complex loading and unloading facilities. The complex nature of the loading and unloading procedures also requires a significant amount of time. The system utilizes a large and bulky loading/unloading frame, which is difficult to work with. The large size of the Gearin loading frame does not lend itself to mass production.

Another Gearin patent, U.S. Pat. No. 4,768,916, discloses a collapsible frame system for loading cars into a shipping container. The Gearin frames are designed to collapse so that a number of the frames can be stored in the same shipping container on a return trip to the point of origin. A problem with this design, however, is that collapsing the frame involves a complex, multi-step procedure. Additionally, numerous components must be removed from the frame before it can be collapsed, and these components may be damaged or lost during a return trip to the point of origin.

Another system for transporting vehicles inside shipping containers has been proposed by J. B. Hunt. In the Hunt system, the frame which holds the cars is assembled inside the container, and the cars are then driven into the container and secured onto the frame. The major disadvantage of this system is that after the cars are driven into the container, it is difficult for the drivers to exit the cars, and there is a danger that the car doors will be damaged from striking the container walls when the doors are opened.

Other systems for containerizing cars for shipment have been proposed. In general, such systems have been intended for overseas shipments on container ships. Containerization is not particularly useful in its previously known configurations for over-land transport of cars, inasmuch as it is usually not feasible to make up containers at an assembly plant having the mixes of cars that the dealers have ordered. Unloading and reloading containers at distribution centers to get the mixes of cars for the dealers using previously proposed systems is, as discussed above, labor-intensive, time-consuming, complicated and costly.

SUMMARY OF THE INVENTION

An object of the present invention is to provide a method of transporting cars from assembly plants to dealers that will reduce the risk of damage from the various hazards mentioned above. Another object is to reduce the overall costs of transportation of new cars from plants to dealers. Still another object is to shorten the time that cars are en route from assembly plants to dealers.

The foregoing and other objects are attained, in accordance with the present invention, by a method of transporting cars from an assembly plant to dealers. According to the invention, each car is loaded at the assembly plant or at a nearby loading facility individually onto a pallet on which the car is supported on its wheels and is secured to the pallet to form a palleted car unit. Also at or near the assembly plant, multiplicities of palleted car units are loaded into first closed housings to form first transportable units. Multiplicities of the first transportable units are then transported to a first distribution center remote from the assembly plant, where the palleted car units are removed from the first closed housings of the first transportable units. At least some of the palleted car units are allocated to selected dealers and loaded into the second closed housings to form second transportable units. The second transportable units are then transported from the distribution center to the selected dealers and unloaded.

One important aspect of the present invention is that the cars are placed individually on and secured to pallets at the assembly plant and remain on the pallets until they arrive at the dealers' lots. They are never driven and are protected from damage caused by careless drivers, intruders, weather, and vandals. The method is amenable to a high degree of automation of conveying and loading equipment at the assembly plant and the distribution centers, thus reducing labor costs, saving time, and minimizing accidents. The palleted car units are also relatively easy to handle, which allows the use of relatively simple equipment for loading, unloading and moving them, not only at the plants and distribution centers but also at the dealers. The ease of handling the palleted car units also facilitates phasing in a system based on the method in stages. In that regard, the palleted cars can, for example, be carried in standard intermodal cargo containers or conventional highway trailers with no modifications to the containers or trailers.

In the majority of cases, the first closed housings into which the palleted car units are loaded at the assembly plants are portions of railroad cars, and the first transportable units are moved to the distribution center by rail. The distribution center usually receives cars from numerous assembly plants, and after unloading, those cars are allocated for reshipment, either to satellite distribution centers, usually by rail, or to dealers by truck. In the latter case, the second closed housings are intermodal cargo containers or highway trailers adapted to be towed by tractors, and the second transportable units are moved to the selected dealers over roadways.

In some embodiments, at least some of the pallets have supporting wheels and palleted car units having pallets with supporting wheels are moved into the first closed housings by rolling along tracks in the first closed housings, such as by endless flexible traction drives installed in the first closed housings.

In an advantageous form of the invention, at least some of the pallets of the palleted car units have upwardly extending columns, and a palleted car unit is assembled in stacked relation over each palleted car unit having columns and is supported by the columns to form a stack of two palleted car units. Each stack of two palleted car units is moved into one of the first closed housings at the plant. By providing each pallet that has columns with supporting wheels, or providing roller beds in the first closed housings, each stack of two palleted car units can be moved into a first closed housing by rolling along tracks in the first closed housing, such as by at least one endless flexible traction drive installed in the first closed housing. It is also possible to form stacks of three palleted car units to increase the loading of each rail car. When the palleted car units are to be transported by container or highway trailer, they are reconfigured to form stacks of two. Similarly, depending on the mixes of cars to be dispatched from the distribution center, some of the stacks of two palleted car units removed from the first closed housings at the distribution center may be unstacked, and after allocation new stacks of two palleted car units are assembled and loaded into second closed housings, which will usually be containers or highway trailers.

There is also provided, according to another aspect of the invention, apparatus for transporting cars from an assembly plant to dealers comprising a plurality of pallets, each adapted to support a car on its wheels in secured relation, and a railway car having a closed housing adapted to receive a plurality of pallets, spaced apart longitudinally extending tracks within the closed housing, rollers interposed between the pallets and the tracks along which the pallets roll when moved into and out of the railway car, and an endless flexible traction drive for connection to each pallet seriatim for moving the plurality of pallets into the closed housing one after the other in end to end relation.

The endless traction drive, preferably, includes an endless flexible member guided along a predetermined path lengthwise of the rail car and having spaced-apart lugs, each engageable with a pallet. Advantageously, the traction drive may include a flexible member associated with each track and located below the pallets as they move along the tracks, a drive wheel associated with each flexible member, and a common drive shaft on which the drive wheels are affixed and extending to a coupling portion adjacent a wall of the housing and adapted to be coupled to a rotary power source.

The flexible member of the traction drive may be a drive chain, which is located below the pallets as they move along the tracks and includes an inclined lead-in portion at one end in which the chain moves up to engage the lugs with the pallets and an inclined lead-out portion at the other end in which the chain moves down to release the lugs from the pallets. By providing the drive chain with pairs of longitudinally spaced apart lugs, each pair being engageable with longitudinally spaced-apart sockets on a pallet, each pallet can be pulled into the closed housing by a front lug of a lug pair and pushed out of the closed housing by a rear lug of a lug pair.

In a preferred embodiment of the apparatus, some of the pallets have upwardly extending columns, which support one or two other pallets to produce a two-tier or three-tier assembly of pallets stacked one above the other.

The invention is susceptible to a wide range of modifications and variations. For example, as suggested above, rollers on which the pallets move into and out of the closed housings may be provided on the pallets or as roller beds in the housings. It is believed that providing them on the pallets is preferable, primarily because it requires fewer rollers in total and considerably reduces the cost and complexity of the tracks in the housings. The rollers on the pallets also facilitate moving the pallets in other places.

It is also believed that the two-tier or three-tier stacks of pallets, with each pallet carrying one car, provide the least costly way of providing two-tier or three-tier transport of the cars, inasmuch as only one level of conveying and traction apparatus is required in the housings and the loading facilities. It is also possible, however, to provide loading facilities and rail cars that enable individual palleted car units to be handled separately in two levels or three levels. The rail cars, in such arrangements, will have elevated tracks, will be served by elevated loading platforms, and will have traction drives at each level.

The individually palleted cars, assembled in stacks, can also be loaded into standard intermodal cargo containers and transported by ship, as is well-known per se. The versatility of enabling the individual palleted car units to be transported in various closed housings and the ability to provide for transport from plant to dealer without being driven are highly advantageous, in that they ensure economical, rapid, low-cost and safe movement.

For a better understanding of the invention, reference may be made to the following description of an exemplary embodiment, taken in conjunction with the accompanying drawings.

DESCRIPTION OF THE DRAWINGS

FIGS. 2 and 3 are schematic side elevational and plan views of a loading facility at an assembly plant for staging and moving palleted car units into closed housings, in this example, highway trailers;

FIGS. 10 to 29 are drawings of an embodiment of a two-tier pallet unit, which, when a car is in place on each pallet, forms a two-tier assembly of two palleted car units, the views being as follows:

FIG. 10—a side elevational view;

FIG. 11—a top plan view;

FIG. 12—a partial side cross-sectional view of a pallet, taken along the lines 12—12 of FIG. 11;

FIG. 13—a partial end cross-sectional view of a pallet, taken along the lines 13—13 of FIG. 11;

FIG. 14—a side view of a lower column bracket;

FIG. 16—a top view of the lower column bracket;

FIG. 16—a top cross-sectional view of the lower column bracket, taken along the lines 16—16 of FIG. 14;

FIG. 17—a side view of an upper column bracket;

FIG. 18—an end view, looking at the left side of FIG. 17, of the upper column bracket;

FIG. 19—a top cross-sectional view of the upper column bracket, taken along the lines 19—19 of FIG. 17;

FIG. 20—a partial end elevational view of a two-tier assembly of pallets;

FIGS. 21 and 22—side and top views of a diagonal brace;

FIGS. 23 and 24—side and end views of a column;

FIG. 25—a side view of a column assembled to a lower column bracket;

FIG. 26—an end view of a pallet guide/roller assembly, which is shown as supported on a track and mounted on side members of a lower pallet;

FIG. 27—a top cross-sectional view of the guide/roller assembly of FIG. 24, taken along the lines 27—27 of FIG. 26;

FIG. 28—a top plan view of the guide/roller assembly; and

FIG. 29—a side elevational view of the guide/roller assembly;

DESCRIPTION OF THE EMBODIMENT

Figure 1:
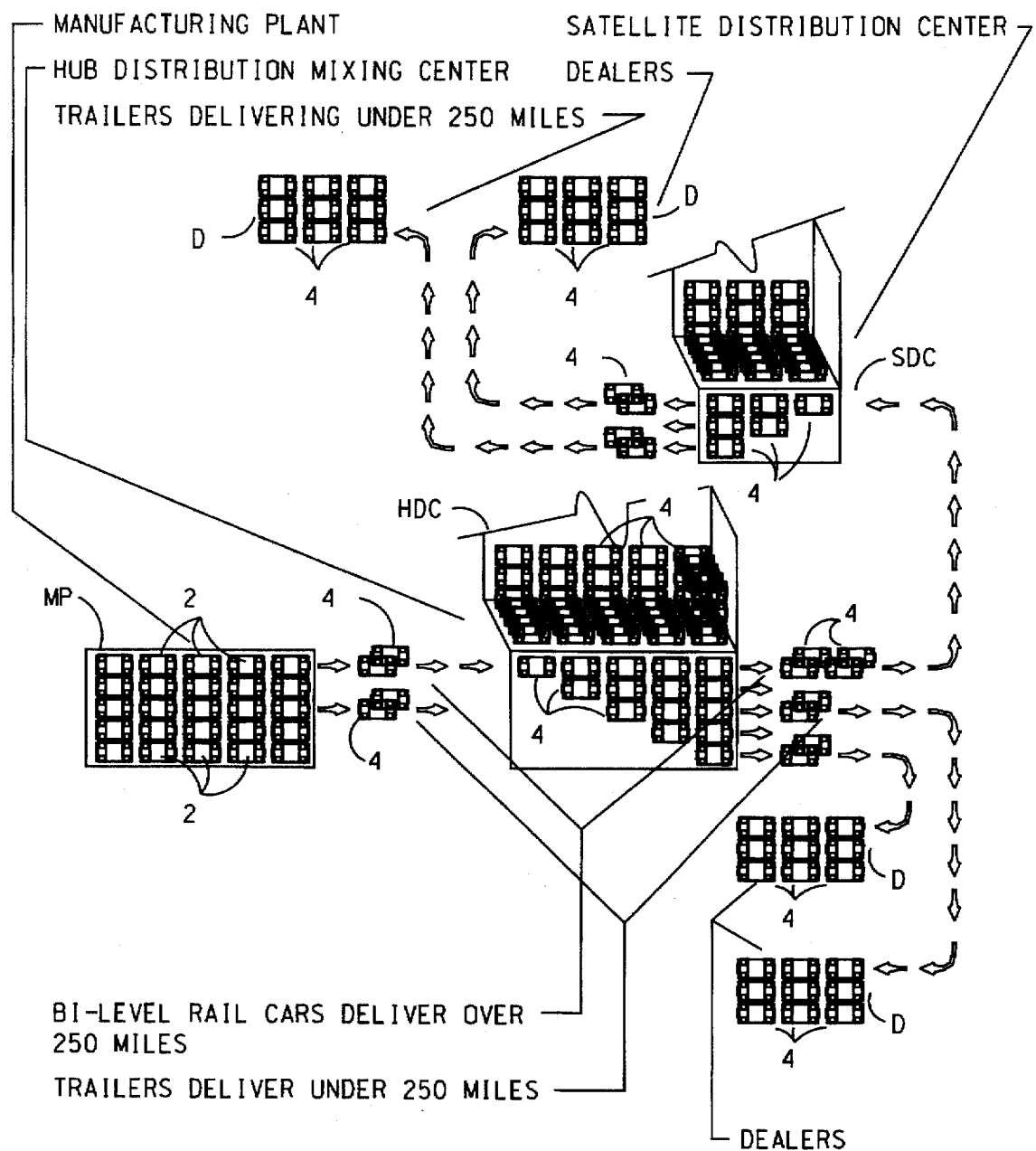
FIG. 1 is a pictorial flow diagram of a method embodying the present invention.

Referring to FIG. 1, finished cars 2 are loaded individually onto pallets (described below) at a loading facility at or near the Manufacturing Plant MP and remain on the pallets as palleted car units 4 through one or a series of unloading, allocation, reloading, and transport movements to Dealers. Some of the palleted car units 4 are transported by highway trailers to nearby Dealers D, this being generally the case for Dealers within about 250 miles from the plant MP. Most of the palleted car units 4 from each of several plants of a manufacturer or a group of manufacturers are transported in closed housings by rail, the closed housings being parts of rail cars or containers loaded onto single or double-stacked container rail cars, to a Hub Distribution Center HDC, where they are unloaded, stored temporarily and allocated for transport to one of a group of Satellite Distribution Centers SDC or to nearby Dealers. The allocated units 4 are loaded into second closed housings and transported, again by rail or truck, to the Satellite Distribution Centers or nearby Dealers. Palleted car units 4 delivered to the Satellite Distribution Centers are unloaded, allocated to dealers, loaded onto trucks and delivered to the Dealers.

There are many variables in how the overall process may be planned and executed. Generally, the concept of a hub and spokes distribution system, which is known per se, is to transport all units that are allocated to dealers more than a certain distance away from a plant to a centrally located hub distribution center. The units are unloaded and reallocated, some to nearby dealers and most to satellite distribution centers, which are located to serve major metropolitan areas (e.g., New York, Chicago, and Los Angeles) or regions (e.g., for the United States, northeast, southeast, midwest, etc.). One or more satellite centers may be at portside for allocation of units to container ships destined to overseas locations. In some cases, both hub and satellite centers may be joint ventures and handle cars from various manufacturers.

The predominant means for transporting the palleted car units 4 for distances of more than about 250 miles over land is by rail. As described below in more detail, the palleted car units 4 are loaded onto special rail cars 6 (FIGS. 4 to 6) or into containers that are loaded onto rail cars. When the cars are destined for export and will be transported overland from the plant MP and then loaded onto a ship, the palleted car units 4 may be placed in containers, either at the plant MP or at a portside facility. For transport to dealers D located less than about 250 miles from the plant MP, the units 4 are transported in closed highway trailers 8 (FIGS. 2, 3, 8 and 9) or in containers carried on a highway trailers chassis.

Figure 4:
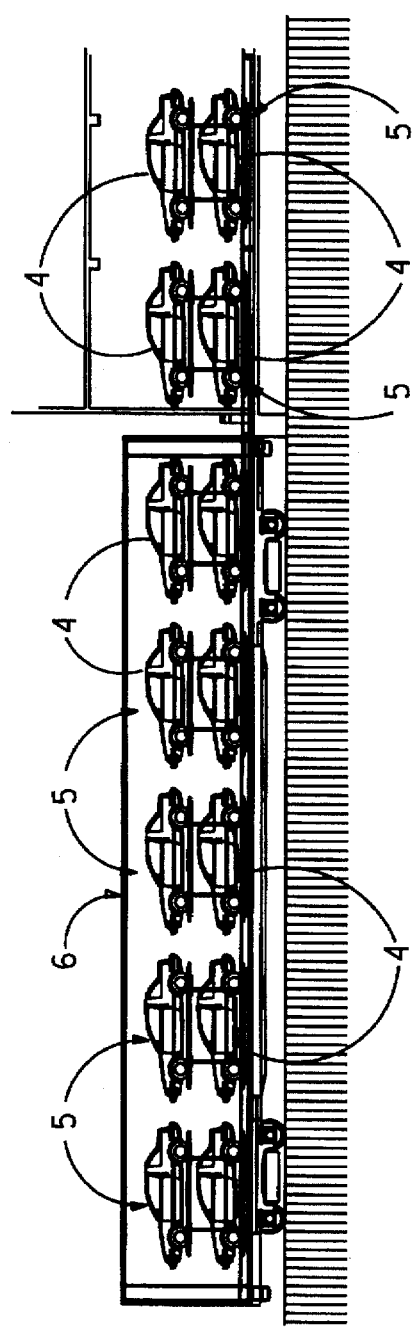
FIGS. 4 and 5 are side elevational and plan views of a facility for staging and loading palleted car units into rail cars in stacks of two.
Figure 5:
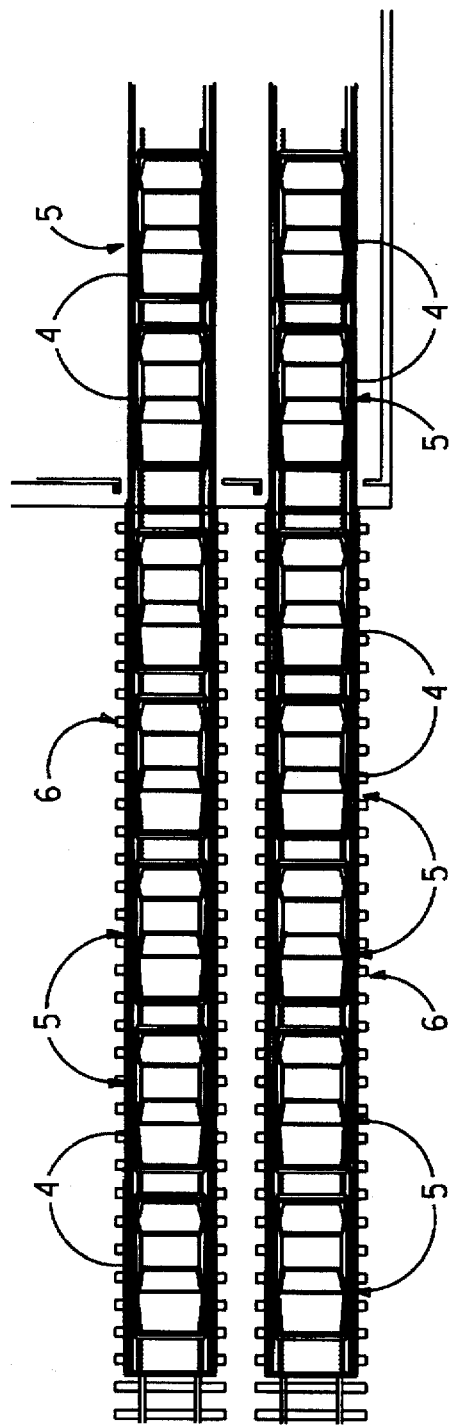
Figure 6:
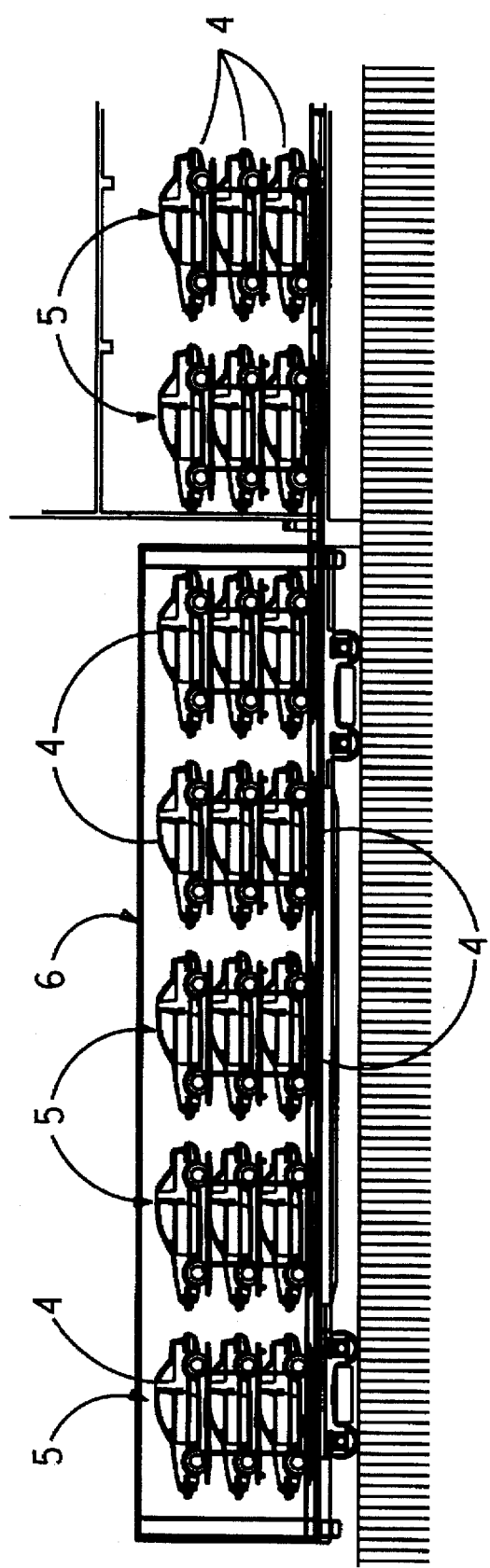
FIG. 6 is a side view of a facility for staging and loading palleted car units into rail cars in stacks of three.

The loading facility at or near the plant MP, as shown in FIGS. 2 and 3, has suitable automated conveyers 200 and overhead cranes 202 for bringing empty pallets (10, described below) to a loading station, loading cars 2 onto pallets, forming two-tier units 5, each consisting of two palleted car units 4 stacked one over the other, and moving the units 5 to a loading dock where highway trailers 8 are waiting. An example of a loading device for loading two-tier units 5 into trailers 8 or containers is a long scissors jack 206, which pushes the two-tier units into the trailers or containers. Alternatively, two-tier units 5 or three-tier units 5' of palleted car units 4 can be assembled and loaded into closed rail cars at or near the plant, as shown in FIGS. 4 to 6. Apparatus for loading several rail cars 6 coupled together is described below. The loading facility at the plant MP shown in FIGS. 2 and 3 can be used to form the units 5 and 5' for loading onto rail cars.

Figure 7:
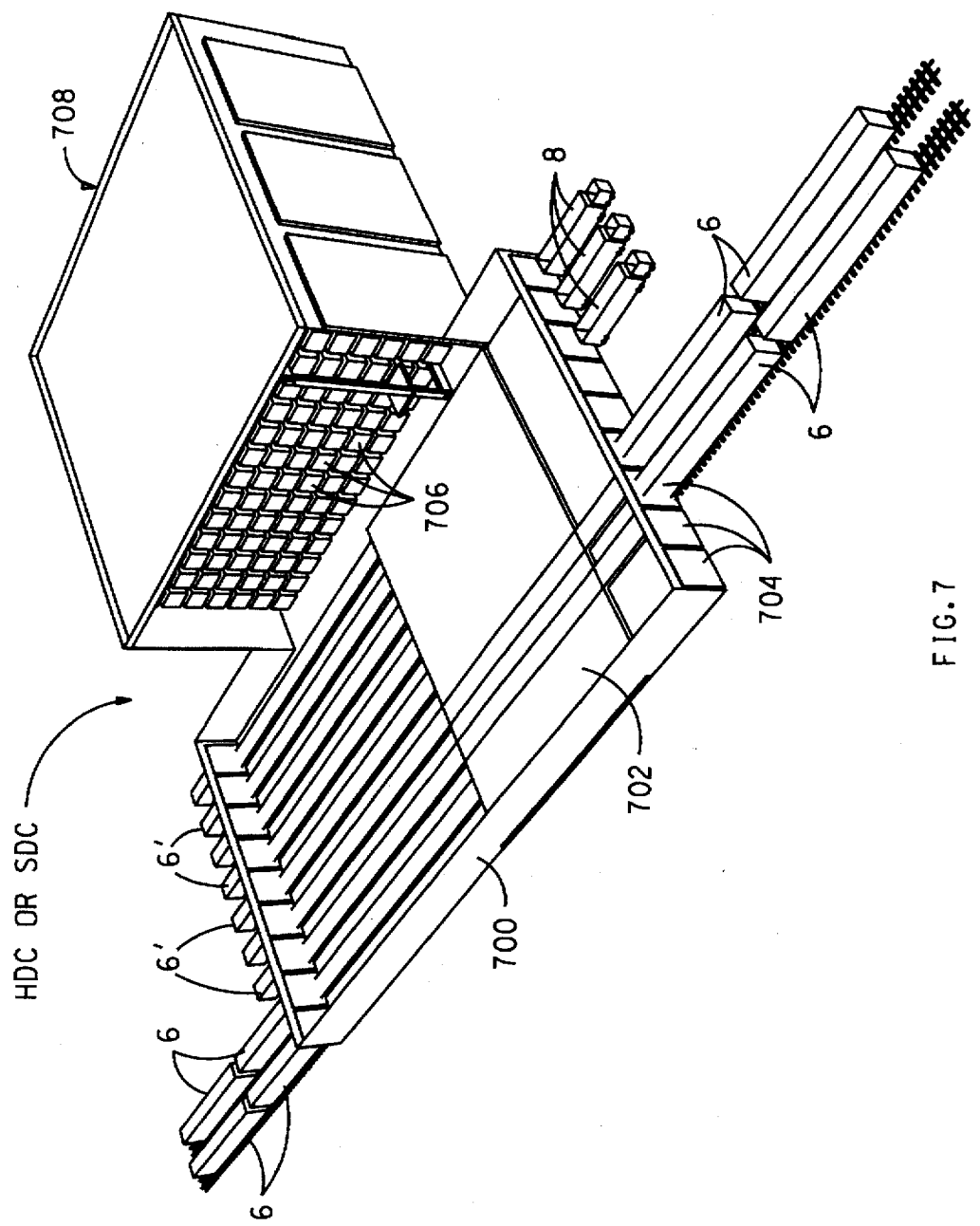
FIG. 7 is a pictorial view of a mixing and distribution terminal where palleted car units from several assembly plants are delivered, unloaded, allocated for delivery to dealers or regional sub-distribution centers, and reloaded.
Figure 8:
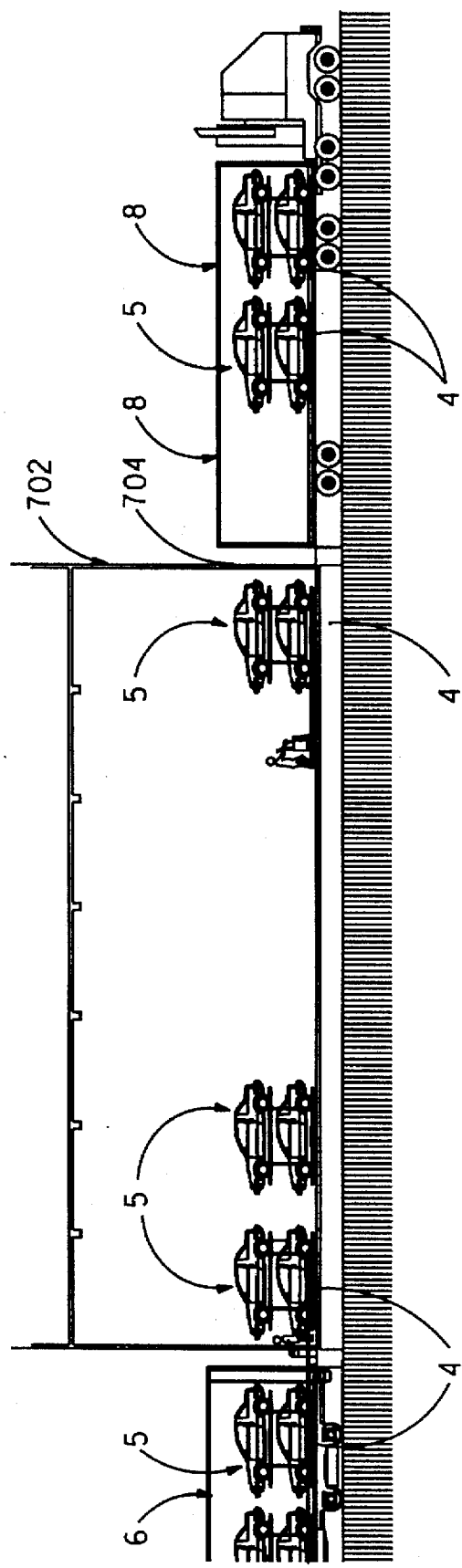
FIG. 8 is an end cross-sectional view of a loading an unloading facility, which is part of a distribution center.

At the Hub Distribution Centers HDC and Satellite Distribution Centers SDC, the rail cars 6, containers 6', or highway trailers 8, as the case may be, are unloaded, the units 4 allocated to their next destination, and loaded, preferably by automated conveyer systems 700 within a building 702 having multiple loading docks 704 served by the conveyor system (FIGS. 7 and 8). Some or all of the palleted car units 4 arriving at the distribution center may be temporarily stored in stacks 706 in an enclosed automated storage and retrieval rack system 708, such as an Eaton-Kenway "CarRise" manufactured by Eaton-Kenway, Inc. All cars in transit are bar-coded with their vehicle identification numbers and tracked by computer. After all cars that make up full loads destined for Dealers or Satellite Distribution Centers have arrived at the Hub Distribution Center, they are retrieved and loaded onto outgoing rail cars 6, containers 6', or trailers 8 by the conveyor systems 700. The computer tracking and control system allows individual palleted car units 4 to be retrieved from storage and moved onto a waiting trailer or a group of rail cars. An automated storage and retrieval system offers many advantages over large, open staging areas. Nonetheless, the palleted car units can also be unloaded from the rail cars, moved to a staging area, and later retrieved, moved back to the loading facility, and loaded for shipment to a satellite distribution center or to dealers.

Figure 9:
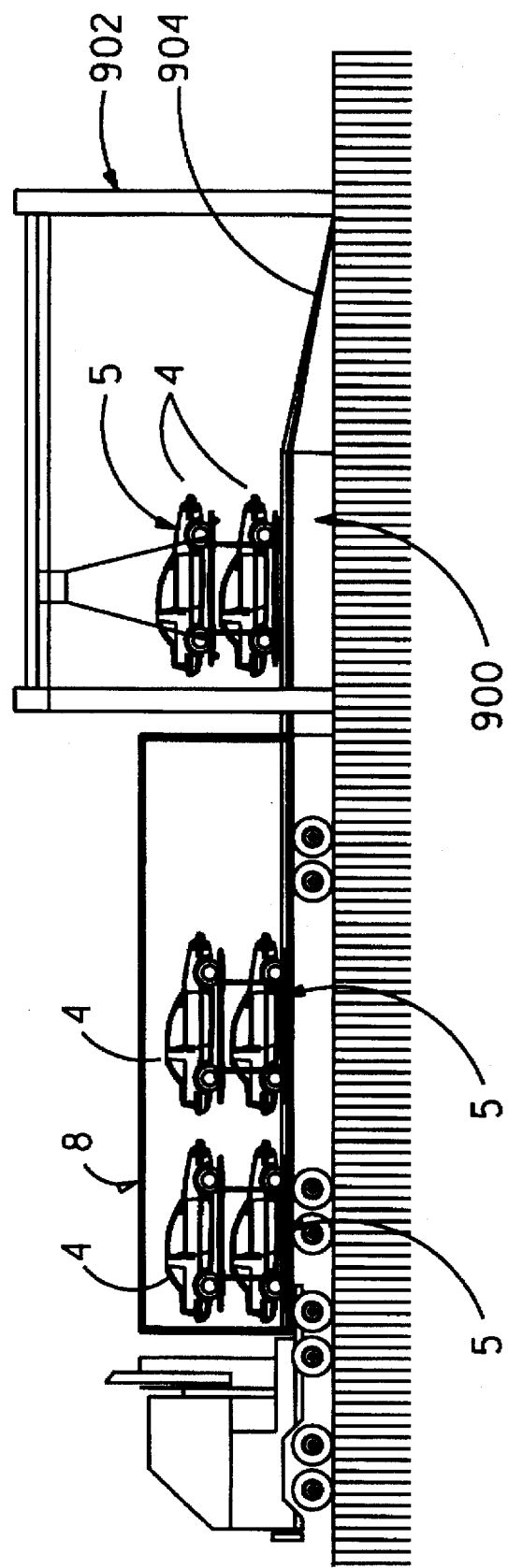
FIG. 9 is a side elevational view of a facility for unloading palleted car units from containers or highway trailers at a dealer.

As illustrated in FIG. 9, palleted car units 4 arrive at Dealers in closed highway trailers 8 (or containers 6' transported by highway trailers, not shown). Each Dealer has an unloading platform 900 and an overhead traveling crane 902. The two-tier stacks of palleted car units 4 are removed from the truck one by one. The upper palleted car unit 4 is lifted by the crane from the supporting columns of the lower palleted car unit and lowered to the ground 904 adjacent of the platform. The car is driven off the pallet to the dealer's storage lot and the pallet moved aside. The lower units are similarly lifted, moved and lowered to the ground. The empty pallets are lifted by the crane, formed into stacks and placed in the trailer or container, in which they are returned to the Distribution Center. Pallets returned to the Distribution Center are moved by rail or highway trailer back to the factories in flow paths that are the reverse of the car delivery paths.

As described below, the columns of the lower pallets fold down, which permits the pallets to be stacked for return to the assembly plant. A trailer 8, container 6', or rail car 6 can transport large numbers of empty pallets in stacks, which leaves room in containers and trailers for other cargo and makes many of the rail cars available for moving other freight. The pallet handling equipment on each rail car (described below) can be used to advantage with pallets designed for other cargo. A facility for receiving and loading other cargo into empty rail cars might, to considerable advantage, be located near each distribution center.

Figure 10:
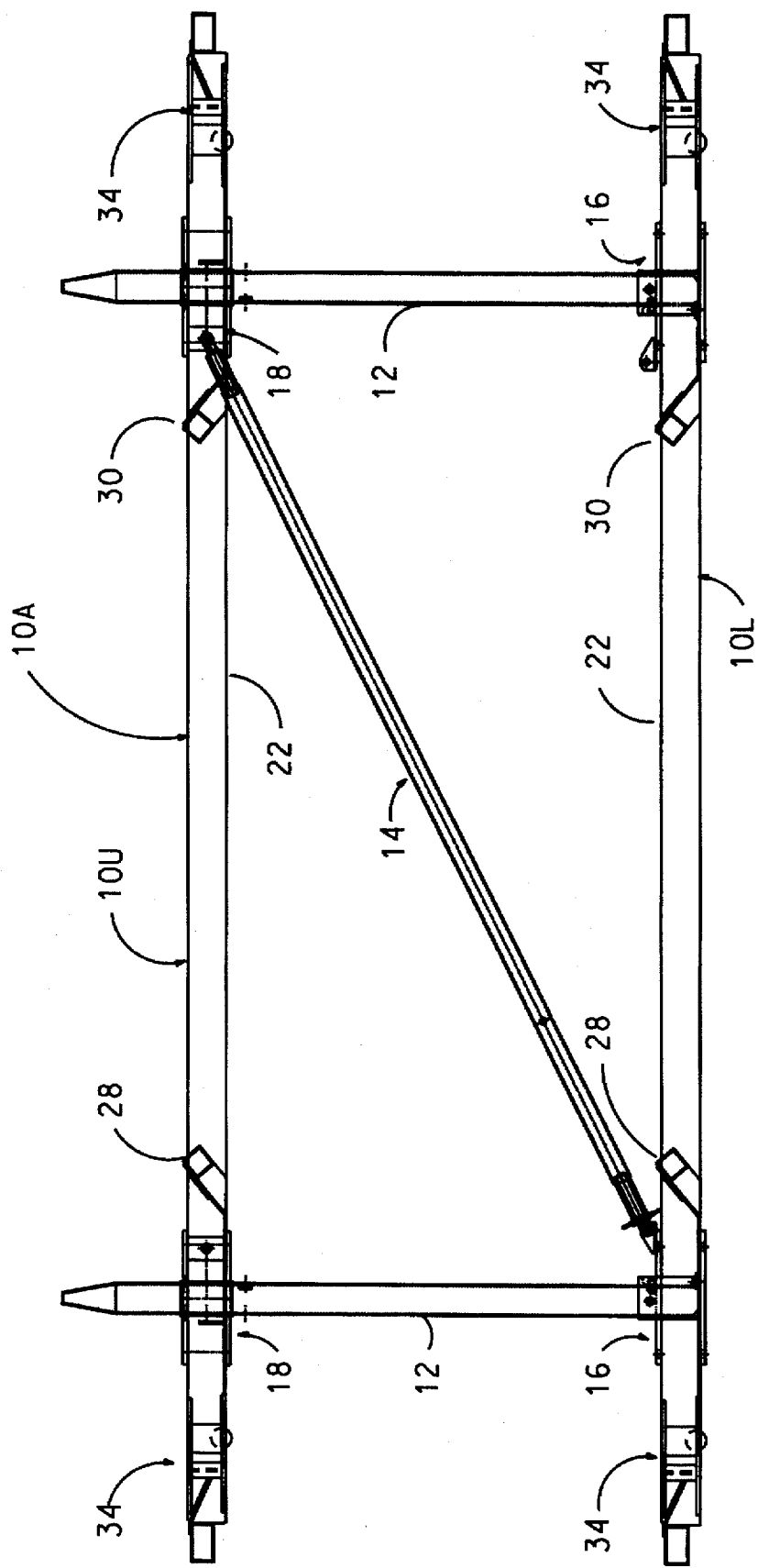

An embodiment of a pallet system for use in transporting cars in the manner described above is shown in FIGS. 10 to 29. Referring first to FIGS. 10 and 11, the system provides a pallet assembly 10A for forming two-tier units 5 of two palleted car units 5 each. Each assembly 10 comprises a lower pallet 10L and an upper pallet 10U, each of which is adapted to receive a car with its wheels supported thereon, and a pair of columns 12 affixed to each side of the lower pallet 10L. The upper pallet 10U is affixed to the columns 12 at a predetermined height above the lower pallet 10L in a position substantially parallel to the lower pallet. (In a modified form, the upper pallet is supported at an angle, as described below.) A length-adjustable brace 14 is connected diagonally between a side of the lower pallet between the columns and a side of the upper pallet between the columns. Braces 14 may be provided on both sides of the assembly, if desired.

The lower and upper pallets 10L and 10U are identical and are fitted with lower column brackets 16 and upper column brackets 18, respectively, for joining the pallets 10 to the columns 12. The pallets (FIGS. 10 and 11) have a peripheral frame constructed from tubular side members 20 and 22 and end members 24, 26 and a pair of cross-members 28, 30. The space 32 within the frame and between the cross members is open. Pan-like wheel-support plates 34 are secured to the frame members at each corner. A tie-down bar 36 is fastened to each end frame member 24, 26.

Figure 14:
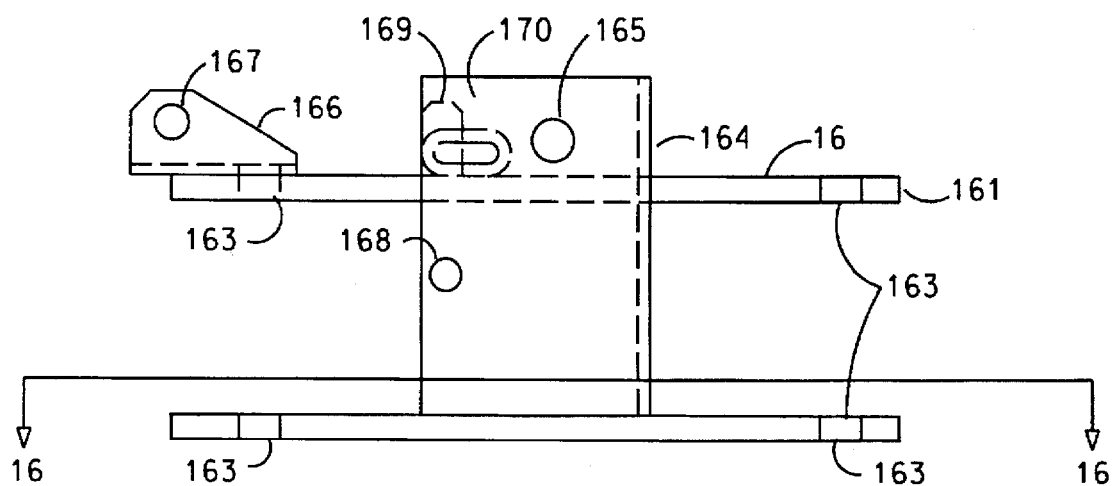
Figure 15:
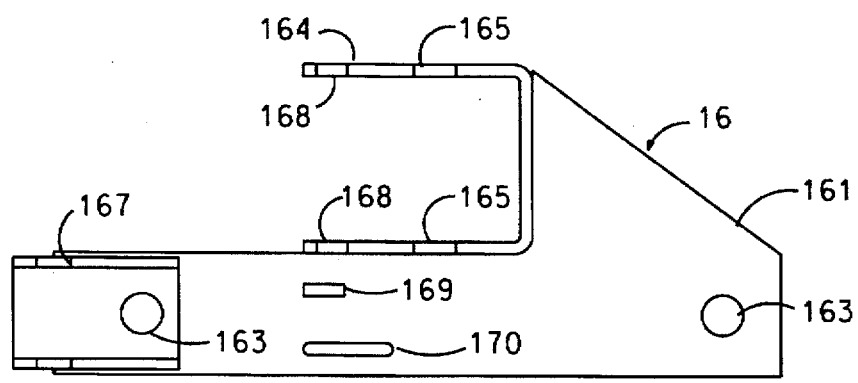
Figure 16:
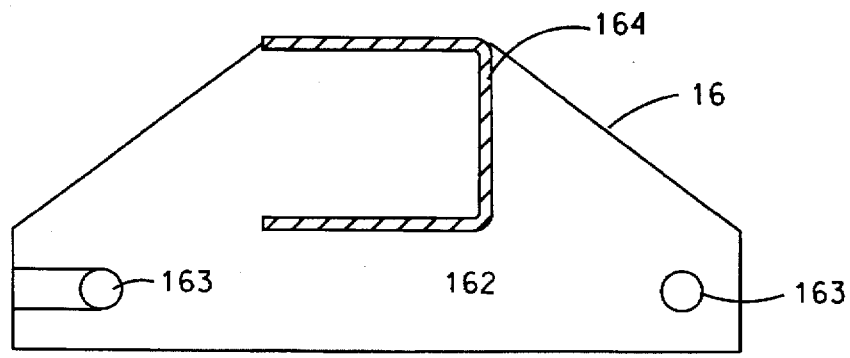
Figure 20:
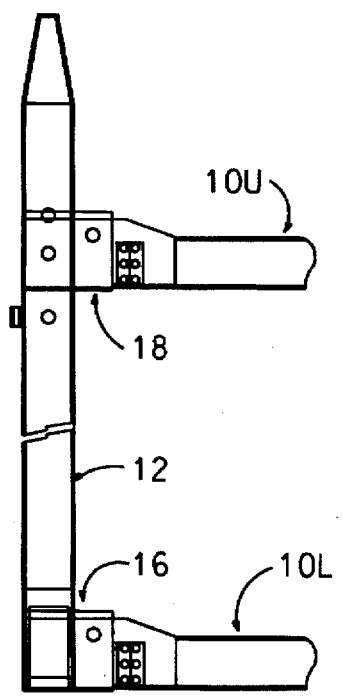
Figure 21:
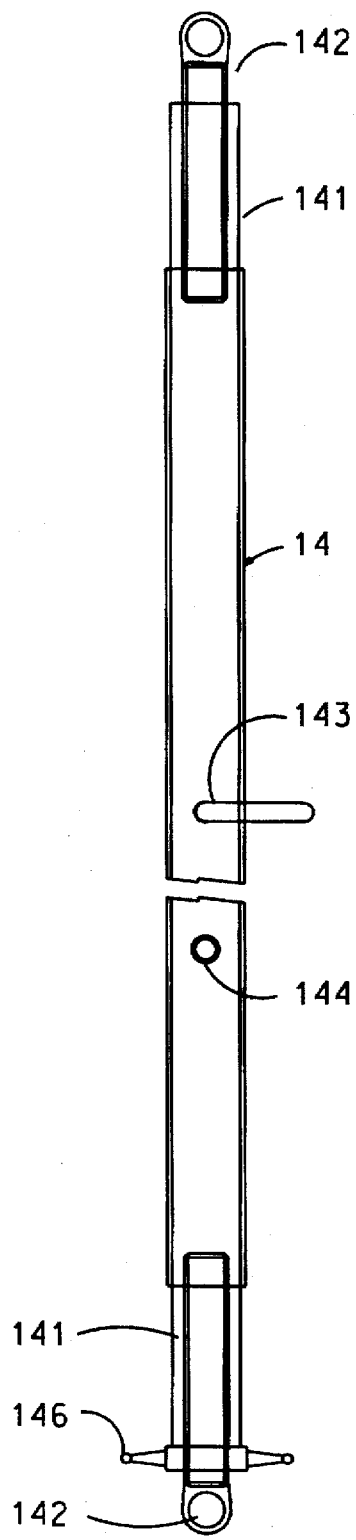
Figure 22:
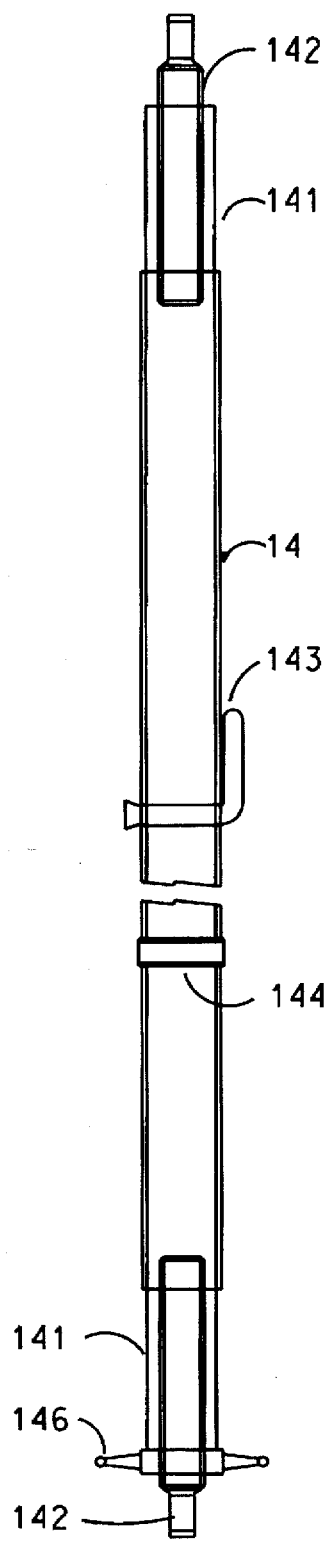

Each lower column bracket 16, as shown in FIGS. 14 to 16, comprises upper and lower plates 161, 162, each having two bolt holes 163, and a U-shaped column socket piece 164, which has aligned holes 165 extending transversely. The plates straddle the side members 20, 22 of the frame, and bolts passing through the holes 165 attach the column brackets to the pallet. A channel-shaped lug 166 is affixed to the upper plate 161 and has transversely aligned holes 167. Transversely aligned holes 168 receive a stop bolt for the column, as described below. A pin keeper plate 169 and a lifting ring 170 extend up from the upper plate laterally of the holes 165.

Each upper column bracket 18, as shown in FIGS. 17 to 19, has upper and lower plates 181 and 182, each having hole pairs for bolting the column bracket to a pallet 10, and a closed tubular socket piece 183 affixed to the plates. Aligned holes 184 extend in the lengthwise direction, relative to the pallet, through the socket piece and receive a coupling pin (not shown) by which the column bracket 18 is affixed to a column, as described below. A pin keeper plate 185 extends up from the lower plate to capture an arm on the pin. A capture pin 186 (hidden and not shown in FIG. 18) for the diagonal brace 14 projects from a plate 187 fastened between the upper and lower plates 181 and 182.

As indicated above, the upper and lower column brackets are attached to the pallets by bolts. As may be seen in FIG. 10, the side members 20, 22 of the pallet frames have several bolt holes for each column bracket, which permits the column brackets to be fastened to the pallets in different lengthwise positions. The ability to adjust the positions of the column brackets on the pallets allows the assembly 10A of two pallets to be configured differently for different vehicles.

Figure 23:
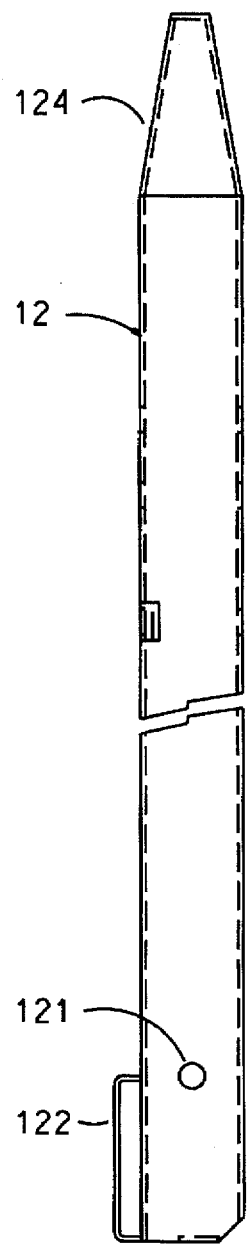
Figure 24:
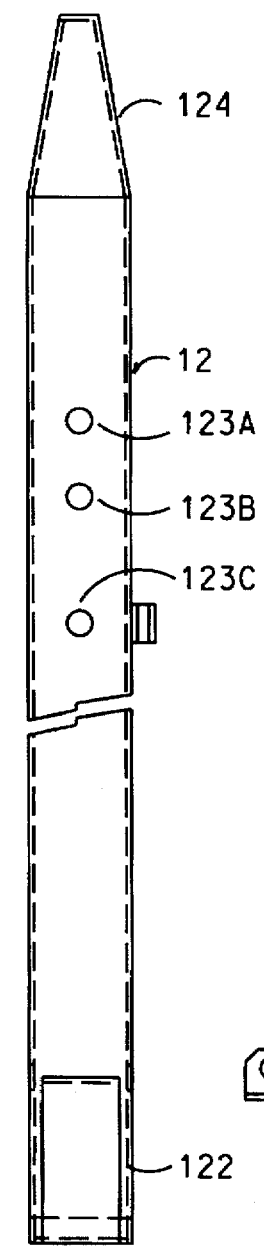
Figure 25:
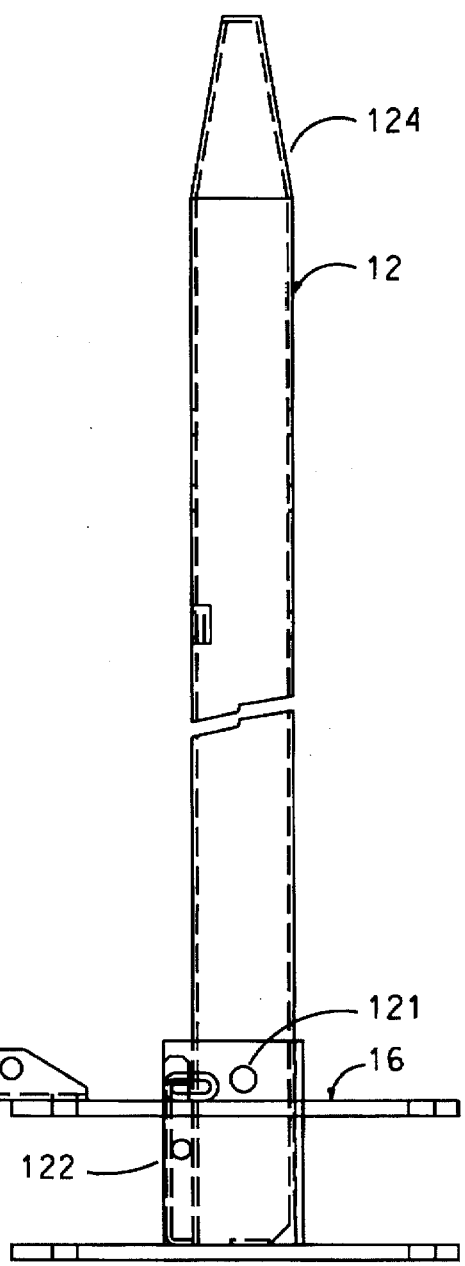

Referring to FIGS. 23 to 25, the columns 12 are tubular and of square cross-section. The external dimensions are such that the lower end of the column is received with a close sliding fit in the socket piece 164 of the lower column bracket 16 and the upper part receives with a close sliding fit the socket piece 183 of the upper column bracket. A hole 121 near the lower end of the column receives a pin, which also passes through the holes 165 in the socket piece 164 of the lower column bracket. The pin pivotally attaches the column to the socket piece such that the column can be collapsed by folding it down through the open side of the socket piece. A channel-shaped plate 122 affixed to the column receives a bolt or pin through the holes 168 in the lower column bracket, which supports the column in the erected, vertical position.

Near the upper end of the column are three pairs of aligned holes 123a, 123b and 123c. Each hole pair provides for attaching the upper pallet 10U to the columns by pins that pass through the holes 184 in the socket pieces 183 of the upper column brackets 18 at a different height above the lower pallet 10L. The selected height depends on the height of the vehicles being transported. It will be noticed that the upper end portion 124 of the column is tapered, which facilitates lowering an upper pallet onto the columns when the stack of two pallets is assembled for a shipment.

The upper pallet 10U can be attached to the columns by attaching a collar to each column 12 at the desired height using one of the holes 123 and a collar of the desired height relative to the hole location. The socket piece 183 of each upper column bracket 18 bears against the collar and supports the upper pallet on the column. It is also possible to provide a permanent collar or other support for the bracket 18 on the column 12 at the desired height.

The diagonal brace 14 (FIGS. 21 and 22) is length-adjustable, first to enable it to be adjusted to match the height of the upper pallet 10U, and, second to enable it to be extended to tighten and impart rigidity to the assembly 10A of two pallets. It is tubular and has threaded fittings 141 affixed to it at both ends, each of which receives an eye bolt 142. The threads of the fittings and eye bolts at either end are of opposite hand so that when the brace body is rotated about its lengthwise axis in one direction, both eye bolts thread out and when rotated in the other direction, both eye bolts thread in. The brace is, in that respect, like a turnbuckle. A short handle 143 is received by the brace tube to facilitate rotating it relative to the eye bolts. In the assembled stack, one eye bolt is fastened to the anchor 166 on the lower column bracket 16 by a bolt passing through the holes 167, and the other eye bolt is received by the pin 186 on the upper column bracket 18 (see FIG. 10). To enable more torque to be applied to the brace 14 than can be applied by the handle 143, a bar can be inserted into a tube 144. A handled lock nut 146 locks the brace against loosening.

As discussed above, the pallets are constructed so that they can be disassembled from the assembly and shipped from a destination to which cars were delivered back to a place of origin in a small volume. The columns 12 and brace 14 fold down against the bottom pallet, and each upper pallet can lie flat on top of a lower pallet. In other words, many pallets and their associated columns and braces can be stacked in a single container, leaving the containers from which some of them came empty for transporting goods on the return trip.

The pallets are loaded at the plant MP either by driving the cars onto them as they come off the assembly line or by depositing them by automated conveyors. The cars, of course, are supported by the pallets with their wheels nesting in the pans 34. Blocking bars, one of which is shown at the lower left in FIG. 11, are fastened to the pallets to block the wheels. Tie downs are fastened between the cars and the tie down bars 36 at the ends of the pallets. The tie downs for the cars on the lower pallets may be highly tightened to lower the cars on their suspensions and thereby reduce the height at which the upper pallet must be located above the lower pallet of a stack. The opening 32 in the upper pallet allows an uppermost part of the body of a car on the lower pallet to protrude through it to above the plane of the upper pallet, which allows cars with higher profiles to be loaded on the stack of two pallets, and accommodated in a standard shipping container or highway trailer.

Before or after the cars are loaded onto the pallets and secured, the columns are erected to stand upright and locked in place. The upper pallet with the car on it is lifted up by a crane or a fork lift and lowered onto the columns to the desired position. The two-level palleted car units 12 can also be assembled automatically by conveyor equipment at the plant in which cars on pallets are moved at two levels into positions one over the other and the upper pallets are lowered onto the columns of pallets of the lower unit.

The diagonal brace 14 is raised and manually adjusted to allow its upper eye bolt to be received on the pin 186 of the upper column bracket and suitably secured in place on the pin, such as by a lock pin or ring (not shown) received by the pin 186 outboard of the eye bolt. The brace is then tightened to take up the looseness in the couplings between the columns and the socket pieces of the column brackets. If desired, diagonal braces can be used on both sides of the assembly 10A.

The lower pallets 10L, optionally, may be fitted with removable side bumpers (not shown), which are fastened by pins or bolts to the side members of the pallets 10 near each corner. The bumpers 30 engage the sides of a highway trailer or a container to guide the stack of two palleted car units when it is loaded into the container and hold it in position laterally. End bumpers or spacers (not shown) can be fitted as required to the ends of the lower pallets 10L to maintain the desired lengthwise spaces between the two-tier units 5 of palleted car units 4 in a trailer 8 or container 6' and between the endmost units 5 and the ends of the trailer or container.

Figure 26:
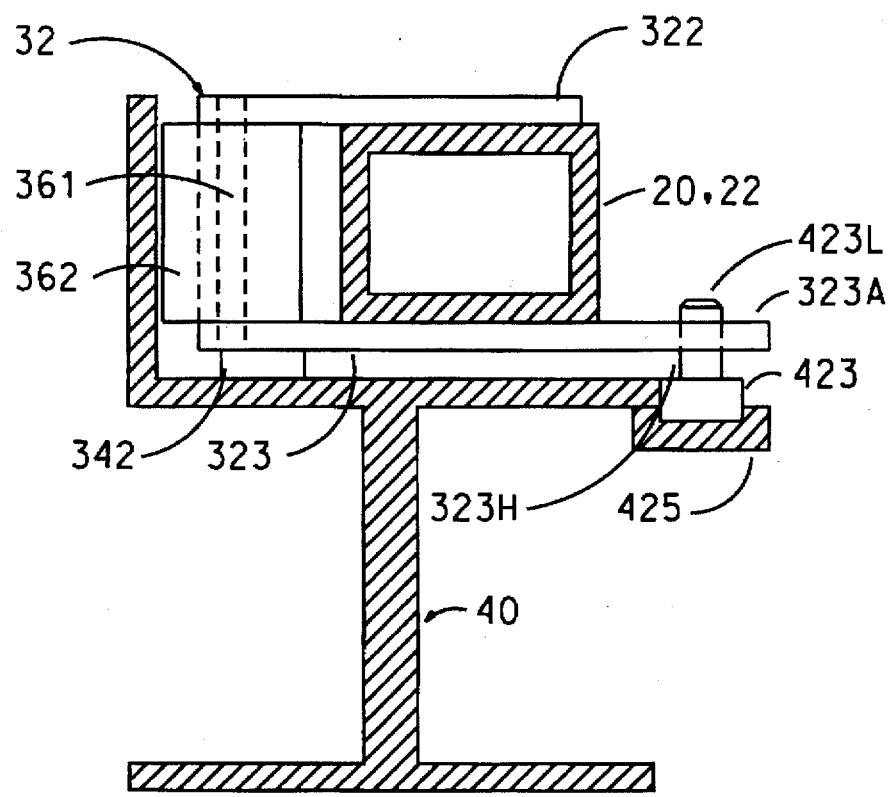

Each pallet 10L and 10U has four roller/guide assemblies 32 (FIGS. 26 to 29 and see also FIGS. 10 and 11), one at each corner. A U-shaped wheel support 321 that is welded between upper and lower mounting plates 322 and 323 receives a roller axle 341 and roller 342. An axle 361 fastened to the mounting plates receives a guide roller 362. The mounting plates straddle and are bolted to the side members 20 or 22 of the lower pallets 10L (FIG. 26). The rollers 342 permit the stacked units 5 of palleted car units 4 to be rolled along tracks or roadways when the units are moved into and out of rail cars, highway trailers and containers and moved from place to place. The stacked units 5 are rolled into trucks and containers, using equipment such as hand-controlled trucks for pushing the units into and pulling them out of the highway trailers and containers and traction conveyers built into the rail cars, as described below.

It is impractical to load and unload rail cars one by one, because uncoupling rail cars and moving them one by one is unduly time-consuming and costly. The present invention includes a relatively simple and inexpensive loading system for loading and unloading stacks 5 of two palleted car units 4 onto and off of a group of several (e.g., five) rail cars while the rail cars of the group remain coupled. The system includes, as shown in FIGS. 26 and 30 to 32, elevated tracks 40 in the form of beams installed on the floor of each rail car for supporting and guiding the stacks 5 of palleted car units 4 along the cars and a roller chain conveyor 42 associated with each track 40 for pulling the stacks 5 one after the other in a train along the tracks 40. The conveyor 42 also pulls each stack into the rail car in which the conveyor is installed from another rail car or from a loading dock and pushes each stack 5 into another rail car or onto a receiving loading dock.

Each chain conveyor 42 comprises a drive sprocket 421 that is affixed to a shaft 422, which is rotatably mounted in bearings (not shown) on the two tracks 40. One end of the shaft 422 extends laterally outwardly to the side of the rail car housing 6h (FIGS. 30 and 31) and has a suitable coupling at its end that enables it to be attached to a portable drive motor/transmission 43 provided at the loading/unloading station. An endless roller chain 423 is trained around the drive sprocket 421 and an idler sprocket 424 at the other end of each track 40.

Figure 27:
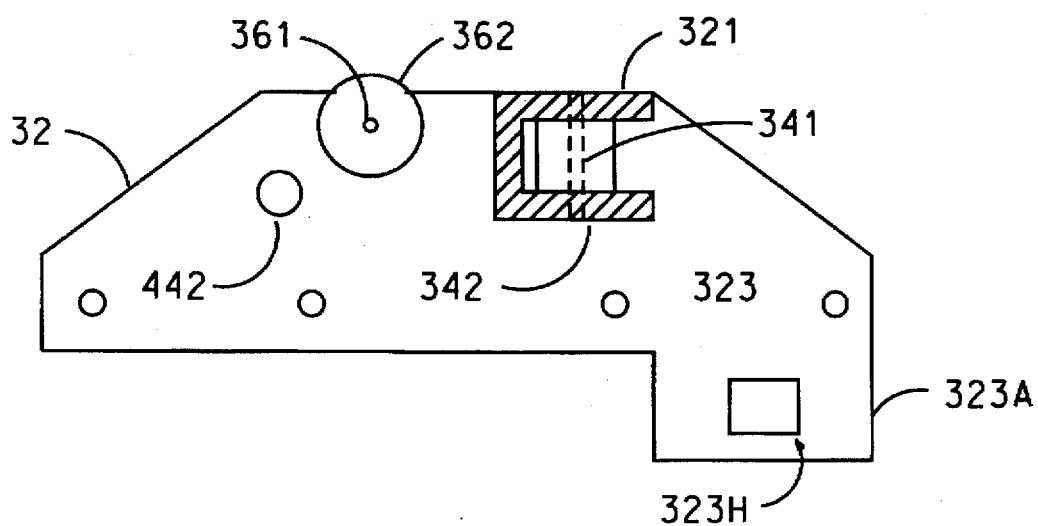
Figure 28:
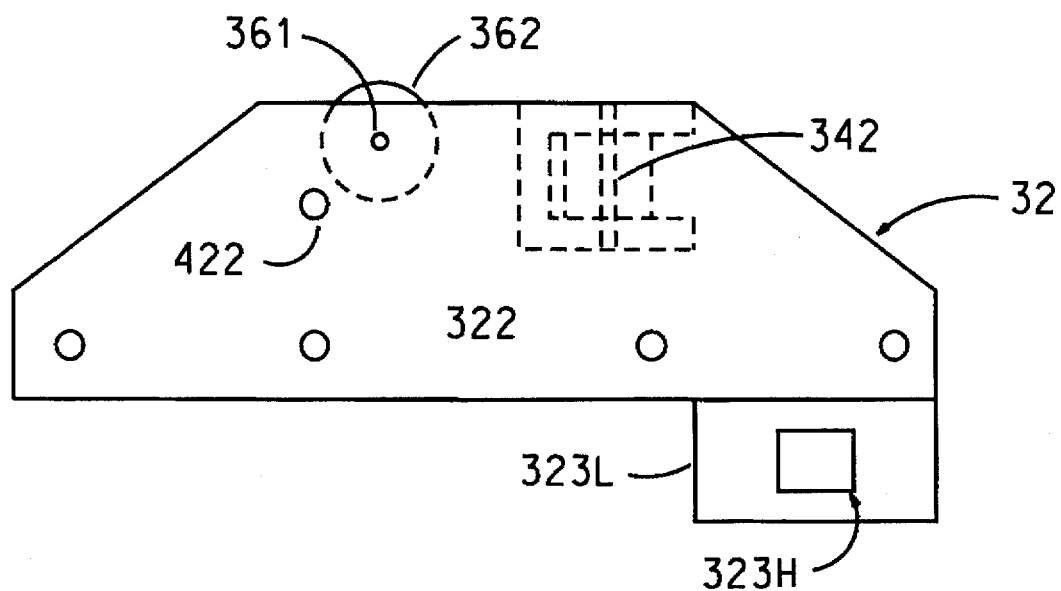
Figure 29:
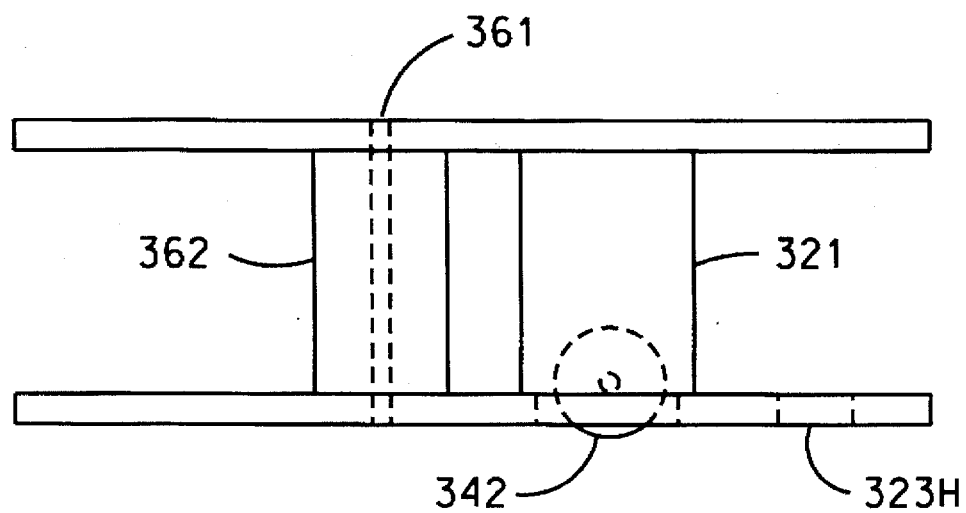
Figure 30:
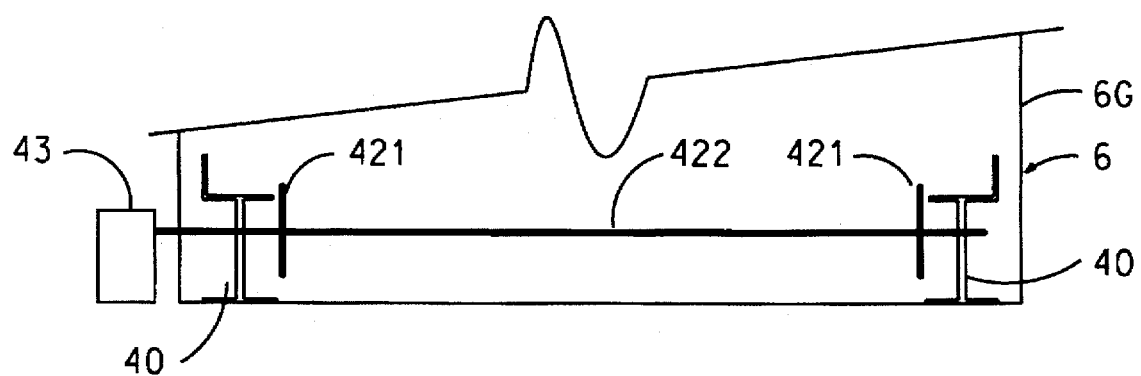
FIG. 30 is a schematic partial end view of a rail car body having tracks for the guide/roller assemblies and chain drives for moving palleted car units along the tracks.
Figure 31:
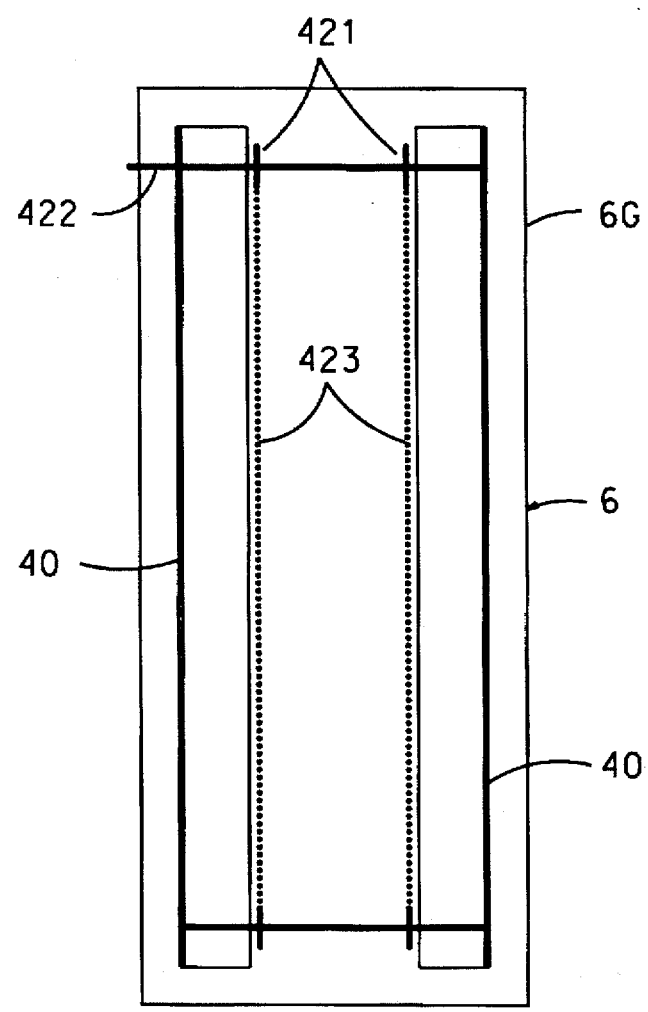
FIG. 31 is a schematic top plan view of the tracks and chain drives of FIG. 30.
Figure 32:
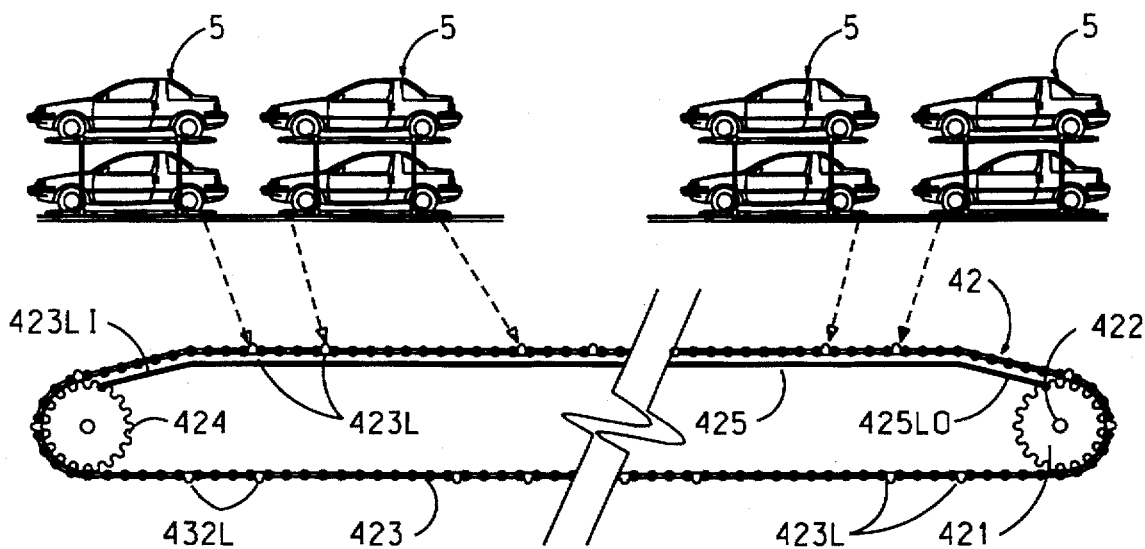
FIG. 32 is a schematic side elevational view of a chain drive of a rail car and shows how the pallets are coupled to the chain drives.

The upper run of the chain 423 is guided along a chain guide 425 that is affixed to the track 40 and has sloping lead in and lead out sections 425LI and 425LO at its ends (FIG. 32). Some of the links of the chain 423 have lugs 423L that, along the upper run of the chain, project upwardly and are spaced apart such as to be received in holes 323H in arm portions 323A of the lower plates 323 of the roller/guide assemblies 32 (FIG. 27). The lugs of each chain are paired so that each palleted car unit stack 5 is engaged by a pair of lugs (one near the front and one near the back of the lower pallets of the stacks) of each of the chains (making a total of four lugs engaging the holes 323H of the corresponding four roller/guide assemblies 32 of each lower palleted car unit). That arrangement enables the chain conveyor 42 of each rail car to pick up the front end of a pallet stack 5 that is pushed partway into the rail car by engaging lugs 423L with the holes 323H of the roller/guide assemblies 32 at the front of the incoming pallet stack. The sloping lead-in portion 425LI of the conveyor automatically brings the lugs 425L into engagement with the holes. Similarly, the arrangement of the chain conveyors 42 of each rail car provides for pushing each stack 5 of two palleted car units 4 partway out of the rail car by engaging lugs 423L with the holes 323H of the roller/guide assemblies 32 at the rear of the outgoing stack. The lug pairs are, of course, spaced apart to maintain the stacked palleted car units end to end in close proximity. As each stack leaves one rail car and enters another, the sloping front lead-out segment 425LO enables the chain lugs 423L to disengage from the holes 323H of the roller/guide assemblies 32 seriatim.

Removable track bridge members (not shown) are placed between the ends of the tracks 40 of adjacent coupled rail cars when they are loaded and unloaded to provide an uninterrupted trackway along a group of several rail cars. Each stack 5 of two palleted car units 4 is pushed partway into the end rail car from the loading platform, and the chain conveyor is operated to pull it into the end rail car. Each successive stack is likewise introduced into the end rail car. Each time the conveyor is operated to bring another stack 5 into the end rail car, all stacks 5 previously loaded are advanced one step. The drive/transmissions for the conveyors of all of the rail cars can be controlled from a single station to operate in coordination. Ultimately, the entire group of coupled rail cars is completely loaded, at which point all of the lower palleted car units 4 of all of the stacks 5 are anchored individually in place by suitable means, such as by retainer bars (not shown) inserted through holes 442 (FIG. 27) in each of the roller/guide assemblies 32 of each lower palleted car unit 4 and matching holes (not shown) provided in the tracks 40. The drive/transmissions 43 for the conveyors can then be disconnected, and the loaded group of rail cars is ready to be taken away.

The unloading process is the reverse of the loading process, except that the stacks 5 of palleted car units are pushed out one by one from the end opposite the end that received cars. Any selected group of rail cars can be loaded at one point and another group unloaded at another—the loading/unloading process with the equipment described above can be carried out with random groups of rail cars.

It is also possible to provide the idler sprockets 424 with a drive shaft and a coupling so that they can be coupled to a transmission unit 43, thus permitting the drive direction to be reversed and stacks to be loaded or unloaded from either end of each rail car.

The tracks and drive units are readily produced as assemblies, which can easily be installed in existing rail cars to retrofit them for use in transporting palleted car units 4. The track and drive units are also suitable for loading and unloading other cargo into and from groups of rail cars using pallets of similar configurations to those of the pallets 10 but with floors or racks to support general cargo loads.

Figure 33:
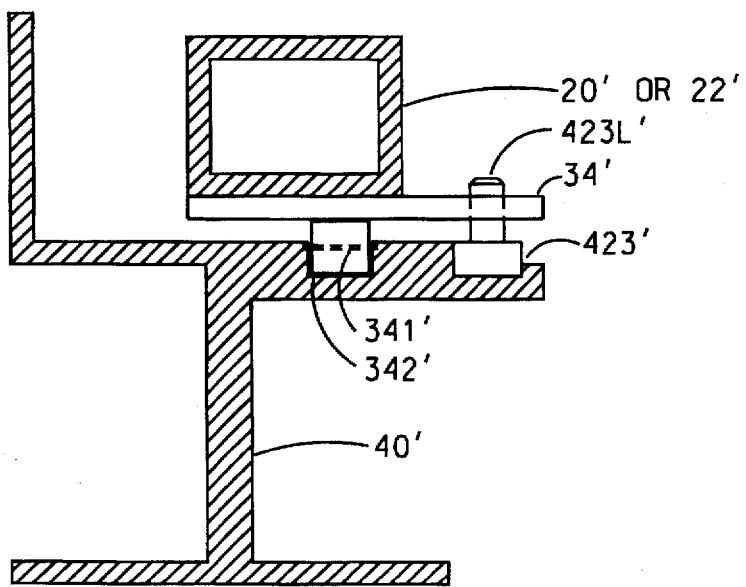
FIG. 33 is a partial end view of a track fitted with a roller bed along which pallets can be rolled onto and off of rail cars.

FIG. 33 shows a modification of a track 40' for a rail car that is set up to handle pallet stacks in which the pallets are not fitted with roller/guide units. Instead the tracks are equipped with spaced-apart rollers 342' supported on shafts 341' along which the pallets roll. In such an arrangement, the side members 20' and 22' of the pallets are made so that there are no projecting portions or elements and a flat rolling surface is presented to the rollers 342'. A drag arm 34' with a hole is fastened to the side member of each lower pallet to accept the lugs 423L' of a traction chain 425'.

Figure 34:
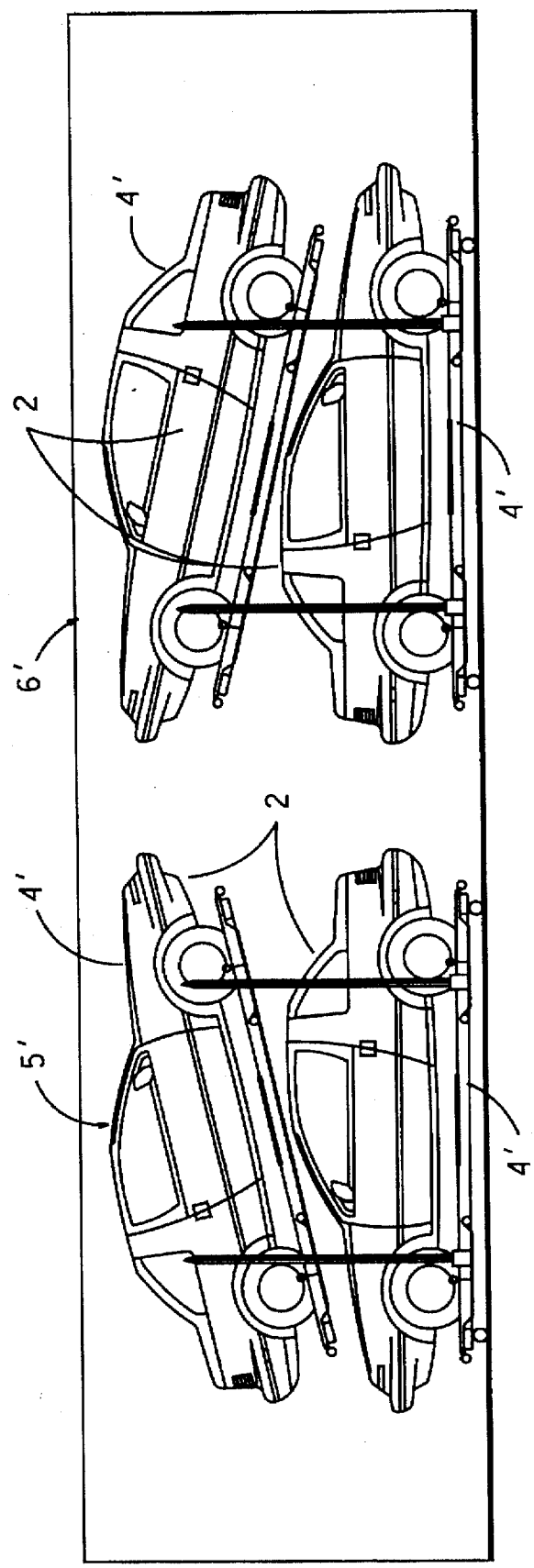
FIG. 34 is a schematic side elevational view showing two-tier stacks of palleted car units, the upper pallets for which have been modified to permit tall cars to be carried in a standard container.

FIG. 34 illustrates stacks 5' of palleted car-units 4' received within a standard cargo container 6'. In order to accommodate relatively large cars 2 on stacked pallets within the container, the upper palleted car unit of each stack is tilted to reduce the overall height of the stack. That is accomplished by providing modified column brackets on the upper pallets, the upper column brackets having the sockets that receive the columns of the lower palleted car unit oriented at an angle to the upper and lower plates, and attaching the upper column brackets to the upper pallet at a greater distance apart lengthwise. The details of the arrangement are not shown in FIG. 34, inasmuch as the modifications are easily understood from the foregoing description and the drawing figure.

I claim:

1. A method of transporting cars from an assembly plant to dealers comprising the following steps:

at the assembly plant loading each car individually onto a pallet on which the car is supported on its wheels and securing the car to the pallet to form a palleted car unit;

at the assembly plant loading multiplicities of palleted car units into first closed housings to form first transportable units;

moving a multiplicity of the first transportable units to a first distribution center remote from the assembly plant;

at the first distribution center removing the palleted car units from the first closed housings of the first transportable units and allocating at least some of the palleted car units individually to selected dealers, the palleted car units being removed from the first closed housings and allocated without removing any of the cars from any of the pallets;

at the first distribution center loading the allocated palleted car units into second closed housings to form second transportable units; and moving the second transportable units from the distribution center to the selected dealers.

2. A method according to claim 1 wherein at least some of the pallets of the palleted car units have upwardly extending columns and a palleted car unit is assembled in stacked relation over each palleted car unit having columns and is supported by the columns to form a stack of two palleted car units, and each stack of two palleted car units is moved into one of the first closed housings.

3. A method according to claim 2 wherein each pallet that has columns has supporting wheels and each stack of two palleted car units is moved into a first closed housing by rolling along tracks in the first closed housing.

4. A method according to claim 3 wherein each stack of two palleted car units is moved into a first closed housing by at least one endless flexible traction drive installed in the first closed housing.

5. A method according to claim 2 wherein each stack of two palleted car units is removed from the first closed housing at the distribution center, the second palleted car units are disassembled from the palleted car units having columns, and after allocation new stacks of two palleted car units are assembled and loaded into the second closed housings.

6. A method according to claim 1 and further comprising the following steps:
- at the first distribution center allocating at least some of the palleted car units to a satellite distribution center,
- at the first distribution center loading the palleted car units allocated to the satellite distribution center into third closed housings to form third transportable units, and
- moving the third transportable units from the first distribution center to the satellite distribution center.

7. A method according to claim 6 wherein the third closed housings are portions of railroad cars and the third transportable units are moved to the satellite distribution center by rail.

8. A method according to claim 7 and further comprising the following steps:
- at the satellite distribution center removing the palleted car units from the third closed housings of the first transportable units and allocating the palleted car units to selected dealers;
- at the satellite distribution center loading the allocated palleted car units into the fourth closed housings to form fourth transportable units; and
- moving the fourth transportable units from the satellite distribution center to the selected dealers.

9. A method according to claim 1 wherein at least some of the pallets have supporting wheels and palleted car units having pallets with supporting wheels are moved into the first closed housings by rolling along tracks in the first closed housings.

10. A method according to claim 9 wherein palleted car units having supporting wheels are moved into the first closed housings by endless flexible traction drives installed in the first closed housings.

11. A method according to claim 1 wherein the first closed housings are portions of railroad cars and the first transportable units are moved to the distribution center by rail.

12. A method according to claim 1 wherein the second closed housings are portions of highway trailers adapted to be towed by tractors, and the second transportable units are moved to the selected dealers over roadways.

13. Apparatus for transporting cars from an assembly plant to dealers comprising a plurality of pallets each adapted to support a car on its wheels in secured relation, and a railway car having a closed housing adapted to receive a plurality of pallets, spaced apart longitudinally extending tracks within the closed housing, rollers interposed between the pallets and the tracks along which the pallets roll when moved into and out of the railway car, and endless flexible traction drive means within the railway car for engaging each pallet seriatim and for moving the plurality of pallets into the closed housing one after the other in end to end relation.

14. Apparatus according to claim 13 wherein the endless traction drive means includes an endless flexible member guided along a predetermined path lengthwise of the rail car and having spaced-apart lugs, each engageable with a pallet.

15. Apparatus according to claim 14 wherein the traction drive means includes a flexible member associated with each trackway and located below the pallets as they move along the tracks, a drive wheel associated with each flexible member and a common drive shaft on which the drive wheels are affixed and extending to a coupling portion adjacent a wall of the housing and adapted to be coupled to a rotary power source.

16. Apparatus according to claim 14 wherein the flexible member is a drive chain, and the drive chain is located below the pallets as they move along the tracks and includes an inclined lead-in portion at one end in which the chain moves up to engage the lugs with the pallets and an inclined lead-out portion at the other end in which the chain moves down to release the lugs from the pallets, and wherein the chain has pairs of longitudinally spaced apart lugs, each pair being engageable with longitudinally spaced-apart sockets on a pallet, whereby each pallet can be pulled into one end of the closed housing by a front lug of a lug pair and pushed out of the other end of the closed housing by a rear lug of a lug pair.

17. Apparatus according to claim 14 wherein a plurality of first pallets have upwardly extending columns, and further comprising a plurality of second pallets supported on and affixed to the columns, each second pallet being adapted to support a car on its wheels in secured relation.

* * * * *